United States Patent Office 2,842,483
Patented July 8, 1958

2,842,483

CARTON WAX COMPOSITION

Samuel Richard Pethrick and Leslie Alan Nash, Sunbury-on-Thames, England, assignors to The British Petroleum Company Limited, London, England, a British joint-stock corporation No Drawing. Application May 23, 1956
Serial No. 586,632

Claims priority, application Great Britain May 26, 1955

6 Claims. (Cl. 196—149)

This invention relates to a wax composition for use in coating paperboard cartons for fruit juice.

The provision of a satisfactory coating for fruit juice cartons has hitherto been difficult owing to the low surface tension of fruit juices. Thus wax compositions which are satisfactory in producing leak-proof cartons for milk or even plain water are not generally satisfactory, in economic amounts, for producing leak-proof cartons for fruit juice. Fruit juice cartons at present manufactured are usually coated with a wax composition containing a proportion of polyethylene and the presence of the latter compound increases the cost of the composition considerably.

The principal object of the present invention is to provide a coating composition for cartons which has a high resistance to fruit juice absorption and which is cheaper than existing compositions containing polyethylene.

According to the invention, a wax composition for coating cartons consists of a blend of 30–80% by weight of 125–130° F. melting point grade (as determined by IP method 55 or ASTM method D87), substantially oil-free paraffin wax, and 70–20% by weight of recrystallized bright stock wax, the recrystallized bright stock wax containing 5–40% by weight of petroleum ceresin wax and 1–3% by weight of oil (i. e. material as determined by ASTM method D721).

The paraffin wax should preferably be one having a fairly wide boiling point spread i. e. greater than 100° F.

Preferably the amount of petroleum ceresin wax in the recrystallized bright stock wax is 20–25% by weight.

Most advantageously the amount of oil in the recrystallized bright stock wax should be 2% by weight.

Recrystallized bright stock wax is prepared from the residue left in the vacuum distillation of crude petroleum oil, which residue is used in the production of bright stock lubricating oil. The residue, after the removal of asphaltic material by treatment with propane, is crystallized firstly at a temperature below 0° F. and the slack or crude wax which is separated is recrystallized at a temperature in the range 30–60° F. The solvent used for this purpose is preferably methyl ethyl ketone/toluene. The crude oil used for the preparation of the recrystallized bright stock wax used in the blend according to the invention should be one containing petroleum ceresin wax.

The term "petroleum ceresin wax," when used in the specification and claims, means the hard, brittle, high-boiling microcrystalline waxes of the ceresin type which are found in many crude petroleum oils e. g. Middle Eastern crude oils and which may be separated from the remainder of the recrystallized bright stock wax by a further crystallization at 95–110° F.

The success of the blend according to the invention when used for coating fruit juice cartons is believed to be due to its wide crystal side spread. The paraffin wax component of the blend consists of large crystals. The recrystallized bright stock wax component, when prepared as described above, is largely microcrystalline in structure and contains a plastic wax (commonly known as petrolatum-type wax), petroleum ceresin wax and a small proportion of oil. The petroleum ceresin wax can be separated from the plastic wax and oil by further recrystallizing the recrystallized bright stock wax at a temperature of 95–100° F. and each of these waxes in blend with paraffin wax shows good resistance to fruit juice absorption but neither blend is satisfactory for carton manufacture. Thus a blend of paraffin wax and plastic wax is difficult to apply to cartons owing to its relatively low congealing point and a blend of paraffin wax and petroleum ceresin wax is too brittle for carton manufacturer. The blend according to the invention, however, does not suffer from the above drawbacks. The presence of a small proportion of oil in the recrystallized bright stock wax improves the flexibility of the final blend and therefore makes it less likely to crack when it is applied to cartons. It is not usually necessary to add any oil separately since the recrystallized bright stock wax, when prepared as described above, always contains a small proportion of oil. Likewise the necessary petroleum ceresin wax will always be present in the recrystallized bright stock wax if it is prepared from a suitable crude oil.

Table 1 compares the orange juice resistance of strips of carton paper which have been impregnated with paraffin wax and various wax blends. The application of the wax to the strips was done by immersing the strips in molten wax and subsequently allowing them to drain in an oven. The recrystallized bright stock wax was prepared from a deasphalted Middle Eastern crude oil residue as described above, the crystallizations being from methyl ethyl ketone/toluene at temperatures of —20° F. and 40° F. respectively. The plastic and petroleum ceresin waxes were prepared from the recrystallized bright stock wax by a further crystallization at 95° F. In this particular case the petroleum ceresin wax amounted to 20–25% by weight of the recrystallized bright stock wax.

It will be seen that the blend according to the invention (blend F) has superior orange juice resistance to all other blends except the paraffin wax petroleum ceresin blend (blend D), but this latter blend is unsuitable for carton manufacture for the reason given previously.

*Table 1*

| Wax | Wax/waxed paper ratio, percent wt./wt. | Orange juice absorbed in hours, m |
|---|---|---|
| A. Paraffin wax 125/130 grade | 35.4 | 1 |
| B. 89% wt. 125/130 grade paraffin wax +11% wt. commercial additive consisting of microcrystalline wax and polyethylene (2% polyethylene in final blend) | 35.0 | 1 |
| C. 70% wt. 125/130 grade paraffin wax +30% wt. plastic wax | 34.7 | |
| D. 70% wt. 125/130 grade paraffin wax +30% wt. petroleum ceresin wax | 36.1 | |
| E. 88% wt. 125/130 grade paraffin wax +10% wt. recrystallized bright stock wax +2% polyethylene | 38.6 | 1 |
| F. 70% wt. 125/130 grade paraffin wax +30% wt. recrystallized bright stock wax | 35.4 | |

Table 2 gives the results of storage tests on cartons filled with orange juice. The cartons were all waxed with the 70/30 wt./wt. paraffin wax/recrystallized bright stock wax blend (blend F), and it will be seen that in order to produce a satisfactory carton the amount of wax on the carton must exceed a certain fairly critical amount

Table 2

| Wax/waxed carton ratio, percent wt./wt. | Time for leaks to appear, days |
|---|---|
| 7.3 | 2 |
| 1.6 | 2 |
| 2.1 | 7 |
| 2.8 | 22 |
| 4.3 | 22 |

We claim:

1. A wax composition consisting of a blend of 30–80% by weight of 125–130° F. melting point grade, substantially oil-free paraffin wax, and 70–20% by weight of recrystallized bright stock wax, the recrystallized bright stock wax containing 5–40% by weight of petroleum ceresin wax and 1–3% by weight of oil.

2. A wax composition according to claim 1, in which the paraffin wax is one having a boiling-point spread of at least 100° F.

3. A wax composition according to claim 1, in which the recrystallized bright stock wax contains 20–25% by weight of petroleum ceresin wax.

4. A wax composition according to claim 1, in which the recrystallized bright stock wax contains 2% by weight of oil.

5. A wax composition according to claim 1, in which the blend consists of 70% by weight of the paraffin wax and 30% by weight of the recrystallized bright stock wax.

6. A wax composition according to claim 1, in which the recrystallized bright stock wax has been prepared from a deasphalted Middle Eastern crude oil residue by crystallization from methyl ethyl ketone/toluene at −20° F. followed by recrystallization from methyl ethyl ketone/toluene at 40° F.

References Cited in the file of this patent

UNITED STATES PATENTS

| | | |
|---|---|---|
| 2,000,427 | Tears | May 7, 1935 |
| 2,127,668 | Adams et al. | Aug. 23, 1938 |
| 2,654,692 | Kiersted et al. | Oct. 6, 1953 |
| 2,773,812 | Tench | Dec. 11, 1956 |

OTHER REFERENCES

Jenkins et al.: Modern Wax Technology (Journal of Chemical Education), April 1949, pp. 182–186.

Minchin: Petroleum Waxes (Institute of Petroleum Review), October 1953, vol. 7, No. 82, pp. 321–328.